US012655033B2

(12) United States Patent
Yoo et al.

(10) Patent No.: US 12,655,033 B2
(45) Date of Patent: Jun. 16, 2026

(54) SACRIFICIAL POSITIVE ELECTRODE MATERIAL WITH REDUCED GAS GENERATION AND METHOD FOR PREPARING SAME

(71) Applicant: LG Energy Solution, Ltd., Seoul (KR)

(72) Inventors: Tae Gu Yoo, Daejeon (KR); Wang Mo Jung, Daejeon (KR); Chi Ho Jo, Daejeon (KR); Ji Hye Kim, Daejeon (KR); Hae Jung Jung, Daejeon (KR); Jong Wook Heo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 642 days.

(21) Appl. No.: 18/004,743

(22) PCT Filed: Feb. 18, 2022

(86) PCT No.: PCT/KR2022/002417
§ 371 (c)(1),
(2) Date: Jan. 9, 2023

(87) PCT Pub. No.: WO2022/182068
PCT Pub. Date: Sep. 1, 2022

(65) Prior Publication Data

US 2023/0331583 A1 Oct. 19, 2023

(30) Foreign Application Priority Data

Feb. 23, 2021 (KR) ........................ 10-2021-0024251
Feb. 8, 2022 (KR) ........................ 10-2022-0016374

(51) Int. Cl.
*C01G 51/42* (2025.01)
*C01G 51/82* (2025.01)
*H01M 10/052* (2010.01)

(52) U.S. Cl.
CPC ............. *C01G 51/42* (2013.01); *C01G 51/82* (2025.01); *H01M 10/052* (2013.01); *C01P 2004/61* (2013.01); *C01P 2006/40* (2013.01)

(58) Field of Classification Search
CPC .................................................. H01M 10/052
See application file for complete search history.

(56) References Cited

U.S. PATENT DOCUMENTS

2010/0112447 A1 5/2010 Yamamoto et al.
2013/0171524 A1* 7/2013 Cho ..................... H01M 4/485 429/223

(Continued)

FOREIGN PATENT DOCUMENTS

CN 115380400 A 11/2022
EP 3878814 A1 9/2021

(Continued)

OTHER PUBLICATIONS

International Search Report for PCT/KR2022/002417 mailed May 31, 2022. 3 pgs.

(Continued)

*Primary Examiner* — Brian R Ohara
(74) *Attorney, Agent, or Firm* — Lerner David LLP

(57) ABSTRACT

Provided are a sacrificial positive electrode material with a reduced gas generation amount and a method of preparing the same. The method includes calcinating a raw material mixture of lithium oxide ($Li_2O$) and cobalt oxide (CoO) to prepare a lithium cobalt metal oxide, wherein the lithium oxide ($Li_2O$) has an average particle size (D50) of 50 μm or less, and the resulting sacrificial positive electrode material has an electrical conductivity of $1\times10^{-4}$ S/cm or more. The method of preparing a sacrificial positive electrode material can reduce the generation of gas, particularly, oxygen ($O_2$) gas, in an electrode assembly during charging of a battery by adjusting the electrical conductivity of the sacrificial posi- (Continued)

tive electrode material within a specific range using lithium oxide that satisfies a specific size, and thus the stability and lifespan of the battery including the same can be effectively enhanced.

7 Claims, 4 Drawing Sheets

(56) References Cited

U.S. PATENT DOCUMENTS

| | | | | |
|---|---|---|---|---|
| 2014/0080002 | A1 | 3/2014 | Han et al. | |
| 2016/0351905 | A1 | 12/2016 | Kawamura et al. | |
| 2017/0012286 | A1 * | 1/2017 | Washida | H01M 4/505 |
| 2019/0165377 | A1 | 5/2019 | Jeon et al. | |
| 2019/0267621 | A1 | 8/2019 | Lee et al. | |
| 2021/0265614 | A1 | 8/2021 | Lee et al. | |
| 2022/0013773 | A1 | 1/2022 | Lee et al. | |
| 2022/0126659 | A1 * | 4/2022 | Delaney | B60J 7/141 |
| 2022/0181627 | A1 | 6/2022 | Park et al. | |

FOREIGN PATENT DOCUMENTS

| | | | |
|---|---|---|---|
| EP | 4109588 | A1 | 12/2022 |
| JP | H04332480 | A | 11/1992 |
| JP | 2014513409 | A | 5/2014 |
| JP | 2015088268 | A | 5/2015 |
| JP | 2022509032 | A | 1/2022 |
| KR | 101129864 | B1 | 3/2012 |
| KR | 20130079109 | A | 7/2013 |
| KR | 101470089 | B1 | 12/2014 |
| KR | 20170003209 | A | 1/2017 |
| KR | 20190012839 | A | 2/2019 |
| KR | 20190059115 | A | 5/2019 |
| KR | 20190100078 | A | 8/2019 |
| KR | 20190142100 | A | 12/2019 |
| KR | 20200043760 | A | 4/2020 |
| KR | 20200051931 | A | 5/2020 |
| KR | 20200066048 | A | 6/2020 |
| WO | 2015115052 | A1 | 8/2015 |

OTHER PUBLICATIONS

Extended European Search Report including Written Opinion for Application No. 22759986.7 dated Feb. 23, 2024, pp. 1-7.

* cited by examiner

【FIG. 1】
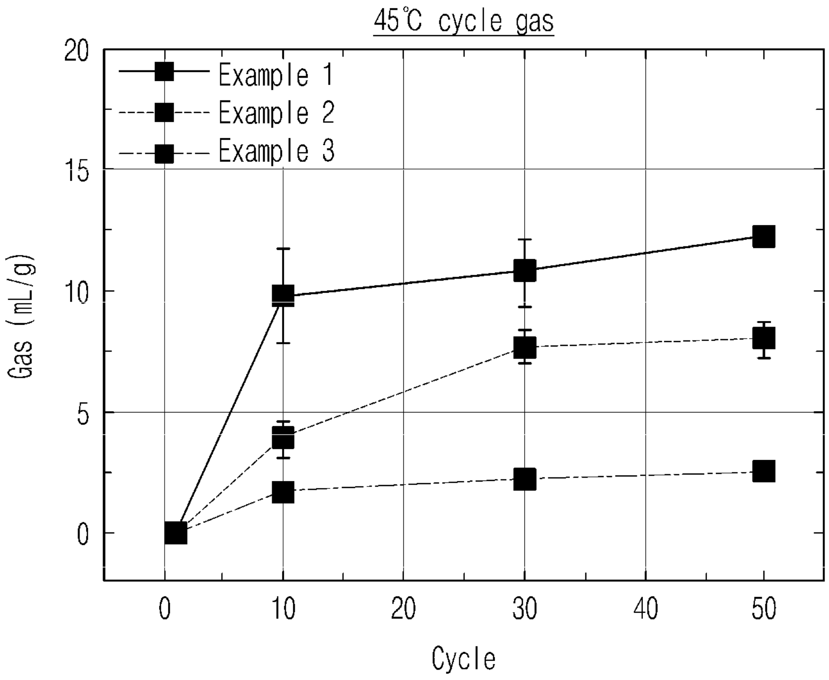

【FIG. 2】
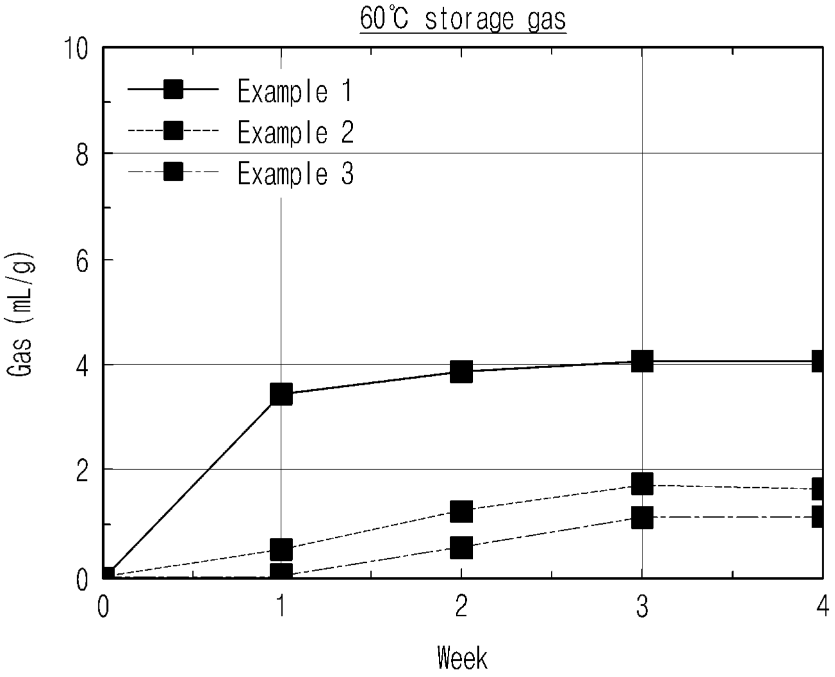

【FIG. 3】
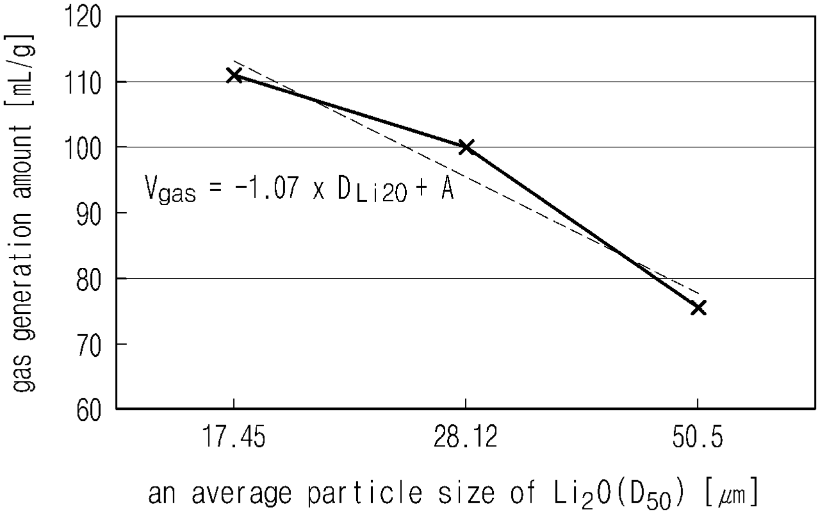

【FIG. 4】
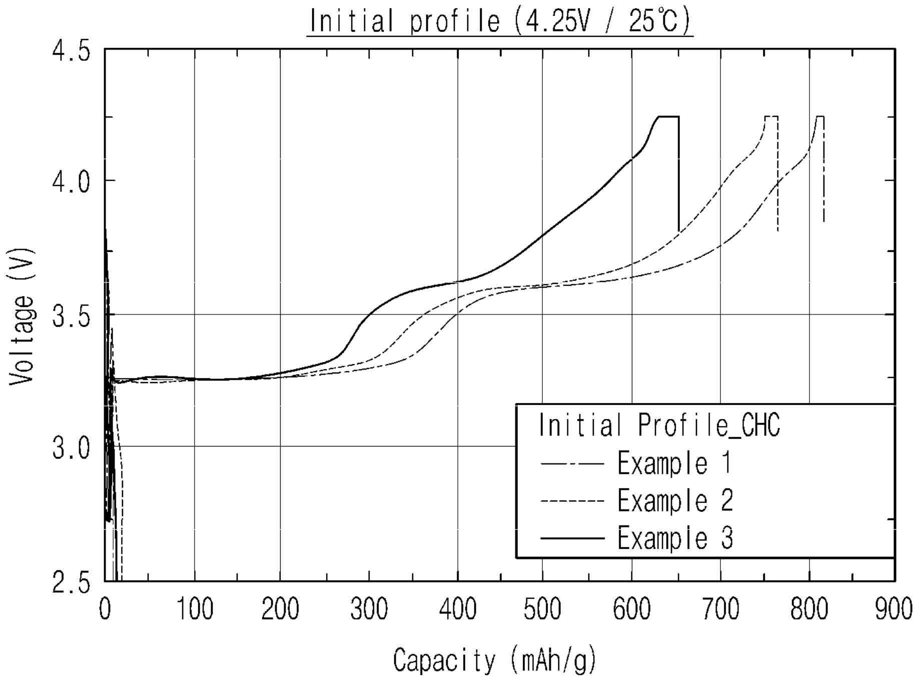

SACRIFICIAL POSITIVE ELECTRODE MATERIAL WITH REDUCED GAS GENERATION AND METHOD FOR PREPARING SAME

CROSS-REFERENCE TO RELATED APPLICATIONS

This application is a national phase entry under 35 U.S.C. § 371 of International Application No. PCT/KR2022/002417, filed on Feb. 18, 2022, which claims priority from Korean Patent Application No. 10-2021-0024251, filed on Feb. 23, 2021, and Korean Patent Application No. 10-2022-0016374, filed on Feb. 8, 2022, the disclosures of which are incorporated by reference herein.

TECHNICAL FIELD

The present invention relates to a method of preparing a sacrificial positive electrode material with a reduced gas generation amount during charging and discharging by controlling the electrical conductivity of a sacrificial positive electrode material within a specific range by adjusting the particle size of a lithium precursor, and a sacrificial positive electrode material prepared thereby.

BACKGROUND

As demand for high-capacity electrode materials has increased in recent years, irreversible additives are required to have a higher irreversible capacity. However, there is a limitation in developing positive electrode additives having a high irreversible capacity.

Meanwhile, a conventional irreversible additive such as $Li_6CoO_4$ is generally prepared by allowing cobalt oxide and the like to react with an excessive amount of lithium oxide. In this case, by-products such as unreacted lithium oxide ($Li_2O$) and the like, which did not participate in the reaction, remain in the finally prepared irreversible additive, and this may cause oxidation in a charging/discharging process to generate oxygen gas inside a battery. The generated oxygen gas may cause volume expansion and the like and thus acts as one of the main factors leading to degradation of battery performance.

Therefore, there is a continuous demand for the development of a positive electrode additive having a higher irreversible capacity while generating a small amount of oxygen in a charging/discharging process of a battery due to a small residual amount of by-products such as lithium oxide and the like.

RELATED-ART DOCUMENTS

Patent Documents

Korean Laid-Open Patent Publication No. 10-2019-0012839

Technical Problem

An object of the present invention is to provide a positive electrode additive having a higher irreversible capacity while generating a small amount of oxygen in a charging/discharging process of a battery, and a positive electrode and lithium secondary battery including the same.

Technical Solution

One aspect of the present invention provides a method of preparing a sacrificial positive electrode material, which includes calcinating a raw material mixture of lithium oxide ($Li_2O$) and cobalt oxide (CoO) to prepare a lithium cobalt metal oxide represented by the following Chemical Formula 1, wherein the lithium oxide ($Li_2O$) has an average particle size ($D_{50}$) of 50 μm or less, and the resulting sacrificial positive electrode material has an electrical conductivity of $1\times10^{-4}$ S/cm or more:

$$Li_xCo_{(1-y)}M_yO_{4-z}A_z \quad \text{[Chemical Formula 1]}$$

wherein,

M is at least one selected from the group consisting of Ti, Al, Zn, Zr, Mn, and Ni, A is an oxygen-substituted halogen, and x, y, and z satisfy $5\leq x\leq 7$, $0\leq y\leq 0.4$, and $0\leq z\leq 0.001$.

Here, the electrical conductivity may range from $1\times10^{-3}$ S/cm to $9\times10^{-3}$ S/cm.

In addition, the calcinating may be performed at 500° C. to 800° C.

In addition, the raw material mixture of lithium oxide ($Li_2O$) and cobalt oxide (CoO) may be obtained by mixing lithium oxide ($Li_2O$) and cobalt oxide (CoO) at a molar ratio of 2 to 4:1.

In addition, the lithium oxide ($Li_2O$) may have an average particle size ($D_{50}$) of 15 μm to 35 μm and a minimum particle size ($D_{min}$) of 2 μm or more.

In addition, the lithium oxide ($Li_2O$) may have a unimodal particle size distribution, wherein 80 to 90% of all particles may be in a particle size range of 10 μm to 45 μm, and 65 to 75% of all particles may be in a particle size range of 15 μm to 35 μm.

In addition, the sacrificial positive electrode material prepared by the method may satisfy the following Equation 1:

$$V_{gas} = -1.07\times D_{Li2O} + A \quad \text{[Equation 1]}$$

wherein, $V_{gas}$ represents an amount (units: mL/g) of gas generated in a positive electrode including the sacrificial positive electrode material, $D_{Li2O}$ represents an average particle size ($D_{50}$, units: μm) of lithium oxide ($Li_2O$), and A is a constant and satisfies $128\leq A\leq 132$.

Another aspect of the present invention provides a positive electrode which includes: a positive electrode current collector; and a positive electrode mixture layer on the positive electrode current collector, the positive electrode mixture layer including a positive electrode active material, a conductive material, an organic binder polymer, and a sacrificial positive electrode material, wherein the sacrificial positive electrode material includes a lithium cobalt metal oxide represented by the following Chemical Formula 1 and has an electrical conductivity of $1\times10^{-4}$ S/cm or more:

$$Li_xCo_{(1-y)}M_yO_{4-z}A_z \quad \text{[Chemical Formula 1]}$$

wherein,

M is at least one selected from the group consisting of Ti, Al, Zn, Zr, Mn, and Ni, A is an oxygen-substituted halogen, and x, y, and z satisfy $5 \leq x \leq 7$, $0 \leq y \leq 0.4$, and $0 \leq z \leq 0.001$.

Here, the positive electrode active material may be a lithium composite transition metal oxide including two or more elements selected from the group consisting of nickel (Ni), cobalt (Co), manganese (Mn), aluminum (Al), zinc (Zn), titanium (Ti), magnesium (Mg), chromium (Cr), and zirconium (Zr).

In addition, the sacrificial positive electrode material may be included in an amount of 0.001 to 5.0 parts by weight with respect to 100 parts by weight of the positive electrode active material.

Still another aspect of the present invention provides an electrode assembly including the positive electrode.

Yet another aspect of the present invention provides a lithium secondary battery including the electrode assembly.

Advantageous Effects

A method of preparing a sacrificial positive electrode material according to the present invention can reduce the generation of gas, particularly, oxygen ($O_2$) gas, in a positive electrode during charging of a battery by adjusting the electrical conductivity of the sacrificial positive electrode material within a specific range using a lithium precursor that satisfies a specific size, and thus the stability and lifespan of a battery including the same can be effectively enhanced.

BRIEF DESCRIPTION OF THE DRAWINGS

FIG. 1 is a graph showing a gas generation amount in a positive electrode according to the number of charging and discharging cycles at 45° C. for each average particle size of lithium oxide ($Li_2O$) used in preparation of a sacrificial positive electrode material.

FIG. 2 is a graph showing a gas generation amount in a positive electrode according to a storage time (units: weeks) at 60° C. for each average particle size of lithium oxide ($Li_2O$) used in preparation of a sacrificial positive electrode material.

FIG. 3 is a graph showing a gas generation amount in a positive electrode according to an average particle size of lithium oxide ($Li_2O$) used in preparation of a sacrificial positive electrode material.

FIG. 4 is a graph showing the initial charging/discharging curve of a sacrificial positive electrode material according to an average particle size of lithium oxide ($Li_2O$) used in preparation of the sacrificial positive electrode material.

DETAILED DESCRIPTION

As the present invention allows for various changes and a variety of embodiments, particular embodiments will be described in detail in the detailed description.

However, this is not intended to limit the present invention to specific embodiments, and it should be understood that all changes, equivalents, or substitutes within the spirit and technical scope of the present invention are included in the present invention.

In the present invention, it should be understood that the term "include(s)" or "have (has)" is merely intended to indicate the presence of features, numbers, steps, operations, components, parts, or combinations thereof, and not intended to preclude the possibility of the presence or addition of one or more other features, numbers, steps, operations, components, parts, or combinations thereof.

In addition, in the present invention, when a portion of a layer, film, region, plate, or the like is referred to as being "on" another portion, this includes not only the case where the portion is "directly on" but also the case where there is another portion interposed therebetween. Conversely, when a portion of a layer, film, region, plate, or the like is referred to as being "under" another portion, this includes not only the case where the portion is "directly under" but also the case where there is another portion interposed therebetween. Also, herein, what is referred to as being disposed "on" may include being disposed not only on an upper part but also on a lower part.

In addition, in the present invention, "$D_{50}$" is the particle size of the point that reaches 50% of the volume percentage in the cumulative curve when calculating the cumulative curve of the particle size distribution with the total volume being 100%, and means the particle size where the volume is 50% by accumulating from the smallest particle size. The average particle size ($D_{50}$) may be measured, for example, using a laser diffraction method, and the laser diffraction method generally enables measurement of a particle size ranging from submicrons to several mm and may obtain a result with high reproducibility and high resolution.

Hereinafter, the present invention will be described in more detail.

Method of Preparing Sacrificial Positive Electrode Material

One aspect of the present invention provides a method of preparing a sacrificial positive electrode material, which includes calcinating a raw material mixture of lithium oxide ($Li_2O$) and cobalt oxide (CoO) to prepare a lithium cobalt metal oxide represented by the following Chemical Formula 1:

[Chemical Formula 1]

$$Li_xCo_{(1-y)}M_yO_{4-z}A_z$$

wherein in Chemical Formula 1,

M is at least one selected from the group consisting of Ti, Al, Zn, Zr, Mn, and Ni, A is an oxygen-substituted halogen, and x, y, and z satisfy $5 \leq x \leq 7$, $0 \leq y \leq 0.4$, and $0 \leq z \leq 0.001$.

The method of preparing a sacrificial positive electrode material according to the present invention is intended to prepare a lithium cobalt metal oxide represented by Chemical Formula 1 as a sacrificial positive electrode material, and the lithium cobalt metal oxide represented by Chemical Formula 1 may include $Li_xCoO_{4-z}A_z$ (where A is F or Cl, and $5.4 \leq x \leq 6.8$ and $0 \leq z \leq 0.0005$ are satisfied) having an anti-fluorite structure and, in some cases, may include $Li_xCoO_{4-z}A_z$ in which any one or more of Ti, Al, Zr, Mn, and Ni are doped at the cobalt (Co) position. Specifically, the lithium cobalt metal oxide may include one or more selected from the group consisting of $Li_6CoO_4$, $Li_6Co_{(1-y)}Ti_yO_4$, $Li_6Co_{(1-y)}Al_yO_4$, $Li_6Co_{(1-y)}Zn_yO_4$, $Li_6Co_{(1-y)}Zr_yO_4$, $Li_6Co_{(1-y)}Mn_yO_4$, $Li_6Co_{(1-y)}Ni_yO_4$ (where $0 \leq y \leq 0.4$), and a mixture thereof.

A sacrificial positive electrode material including the lithium cobalt metal oxide may be prepared by calcinating a raw material mixture of lithium oxide ($Li_2O$) and cobalt oxide (CoO) mixed at a molar ratio of 2 to 4:1, for example, at a molar ratio of 2.5 to 3.5:1 or 2.95 to 3.1:1. When one or more oxides of Ti, Al, Zr, Mn, and Ni are added to the raw material mixture, a lithium cobalt metal oxide which is doped with one or more of Ti, Al, Zr, Mn, and Ni may be prepared.

In this case, the calcinating may be performed under an inert gas atmosphere containing a small amount of oxygen gas, for example, under an argon (Ar) gas or nitrogen ($N_2$) gas atmosphere containing oxygen gas at a partial pressure of 0.01 to 0.1%, 0.02 to 0.09%, or 0.05 to 0.08%.

In addition, the calcinating temperature is not particularly limited as long as it is in a temperature range in which the mixed metal oxides are able to be changed into the lithium cobalt metal oxide represented by Chemical Formula 1. Specifically, the calcinating temperature may be 500° C. to 800° C., more specifically, 500° C. to 700° C., 600° C. to 800° C., 600° C. to 750° C., 650° C. to 800° C., 630° C. to 770° C., or 660° C. to 740° C.

As one example, the calcinating may be performed under an argon (Ar) gas atmosphere containing oxygen gas at a partial pressure of 0.04 to 0.07% at 670° C. to 730° C. for 2 to 20 hours. In this case, the fraction of the lithium cobalt metal oxide represented by Chemical Formula 1 in the prepared sacrificial positive electrode material may be increased, and accordingly, an amount of gas generated during charging and discharging of a battery may be reduced.

In addition, in the method of preparing a sacrificial positive electrode material according to the present invention, lithium oxide ($Li_2O$), whose particle size is adjusted within a specific range, may be used without particular limitation in a shape thereof as a raw material. Specifically, in the method of preparing a sacrificial positive electrode material, lithium oxide ($Li_2O$) having an average particle size ($D_{50}$) of 50 μm or less may be used, and more specifically, lithium oxide ($Li_2O$) having an average particle size ($D_{50}$) of 10 μm to 50 μm, 10 μm to 40 μm, 10 μm to 30 μm, 10 μm to 20 μm, 20 μm to 50 μm, 25 μm to 50 μm, 15 μm to 40 μm, 15 μm to 35 μm, 15 μm to 25 μm, 20 μm to 40 μm, 25 μm to 35 μm, or 15 μm to 20 μm may be used.

In this case, the lithium oxide ($Li_2O$) may have a minimum particle size ($D_{min}$) of 2 μm or more, more specifically, 2.5 μm or more, 3 μm or more, 5 μm or more, 2 μm to 25 μm, 2 μm to 20 μm, 2 μm to 10 μm, 2 μm to 7 μm, 2 μm to 4.5 μm, 4 μm to 10 μm, 15 μm to 25 μm, or 18 μm to 22 μm.

In addition, the lithium oxide ($Li_2O$) may have a unimodal particle size distribution. In the case of the lithium oxide ($Li_2O$) having a unimodal particle size distribution, 80 to 90% of all particles may be in a particle size range of 10 μm to 45 μm, and 65 to 75% of all particles may be in a particle size range of 15 μm to 35 μm.

As one example, the lithium oxide ($Li_2O$) may have a unimodal particle size distribution, an average particle size ($D_{50}$) of 25 μm to 30 μm, and a minimum particle size ($D_{min}$) of 4 μm to 6 μm, and 80 to 90% of all particles may be in a particle size range of 12 μm to 40 μm, and 65 to 75% of all particles may be in a particle size range of 20 μm to 35 μm.

By adjusting the particle size of lithium oxide ($LiO_2$), which is a raw material as described above, the method of preparing a sacrificial positive electrode material according to the present invention may prevent the degradation of workability in the preparation process due to lithium oxide having a small particle size that easily floats and may prevent the degradation of the yield of a sacrificial positive electrode material due to a decrease in the reactivity of lithium oxide having a large particle size. In addition, conventionally, a sacrificial positive electrode material including the lithium cobalt metal oxide represented by Chemical Formula 1 has an anti-fluorite structure through a calcinating process, and the sacrificial positive electrode material generates gas containing oxygen ($O_2$), carbon monoxide (CO), carbon dioxide ($CO_2$), hydrogen ($H_2$), and the like during charging and discharging at high temperature even after initial charging and discharging. However, when lithium oxide ($Li_2O$) whose particle size is adjusted within the above-described range is used as in the present invention, the electrical conductivity of the prepared sacrificial positive electrode material may be controlled to satisfy a specific range, and accordingly, an amount of gas generated during charging and discharging of a battery including the sacrificial positive electrode material may be reduced.

As one example, a sacrificial positive electrode material prepared according to the present invention may have a powder electrical conductivity of $1\times10^{-4}$ S/cm or more, and specifically, the upper limit thereof may be $9\times10^{-3}$ S/cm or less, $8\times10^{-3}$ S/cm or less, $7\times10^{-3}$ S/cm or less, or $6\times10^{-3}$ S/cm or less, and the lower limit thereof may be $5\times10^{-4}$ S/cm or more, $8\times10^{-4}$ S/cm or more, $1\times10^{-3}$ S/cm or more, or $2\times10^{-3}$ S/cm or more. More specifically, the sacrificial positive electrode material may have a powder electrical conductivity of $1\times10^{-3}$ S/cm to $9\times10^{-3}$ S/cm, $2\times10^{-3}$ S/cm to $9\times10^{-3}$ S/cm, $4\times10^{-3}$ S/cm to $8.5\times10^{-3}$ S/cm, $4\times10^{-3}$ S/cm to $6.5\times10^{-3}$ S/cm, or $5\times10^{-3}$ S/cm to $8.2\times10^{-3}$ S/cm.

As another example, a sacrificial positive electrode material prepared according to the present invention may satisfy the following Equation 1 by substantially reducing an amount of gas generated during initial discharging of a battery:

$$V_{gas} = -1.07\times D_{Li2O} + A \quad \text{[Equation 1]}$$

wherein in Equation 1, $V_{gas}$ represents an amount (units: mL/g) of gas generated in a positive electrode including a sacrificial positive electrode material, $D_{Li2O}$ represents an average particle size ($D_{50}$, units: μm) of lithium oxide ($Li_2O$), and A is a constant and satisfies $128\leq A\leq 132$.

Equation 1 represents the correlation between an amount of gas generated in a positive electrode during initial discharging of a battery manufactured using a sacrificial positive electrode material prepared according to the present invention and an average particle size ($D_{50}$) of lithium oxide ($LiO_2$) used in preparation of a sacrificial positive electrode material. A sacrificial positive electrode material prepared according to the present invention is prepared using lithium oxide ($Li_2O$) having an average particle size ($D_{50}$) of 50 μm or less, and a positive electrode manufactured using the same generates 70 mL/g or less, specifically, 70 mL/g to 130 mL/g of gas during initial discharging. Therefore, Equation 1 may be satisfied.

The method of preparing a sacrificial positive electrode material according to the present invention can reduce the generation of gas, particularly, oxygen ($O_2$) gas, in a positive electrode during charging of a battery by controlling the electrical conductivity of a sacrificial positive electrode material within a specific range using lithium oxide that satisfies a specific average particle size ($D_{50}$) range, and thus the stability and lifespan of a battery including the same are effectively enhanced.

Positive Electrode

Another aspect of the present invention provides a positive electrode which includes: a positive electrode current collector; and a positive electrode mixture layer on the positive electrode current collector, the positive electrode mixture layer including a positive electrode active material, a conductive material, an organic binder polymer, and a sacrificial positive electrode material, wherein the sacrificial positive electrode material includes a lithium cobalt metal oxide represented by the following Chemical Formula 1 and has an electrical conductivity of $1\times10^{-4}$ S/cm or more:

[Chemical Formula 1]

$$Li_xCo_{(1-y)}M_yO_{4-z}A_z$$

wherein in Chemical Formula 1,

M is at least one selected from the group consisting of Ti, Mg, Al, Zn, Zr, Mn, and Ni, A is an oxygen-substituted halogen, and x, y, and z satisfy $5\leq x\leq 7$, $0\leq y\leq 0.4$, and $0\leq z\leq 0.001$.

The positive electrode according to the present invention has a structure in which a positive electrode mixture layer is formed on a positive electrode current collector, wherein the positive electrode mixture layer includes a sacrificial positive electrode material prepared by the method of the present invention, the sacrificial electrode material including a lithium cobalt metal oxide represented by Chemical Formula 1 together with a positive electrode active material, a conductive material, and an organic binder polymer, and thus the generation of gas, particularly, oxygen ($O_2$) gas, during charging and discharging of a battery and/or high-temperature storage after activation, is effectively reduced.

As one example, when a battery is subjected to 50-cycle charging and discharging (45° C. and 4.5C/0.3C conditions) after activation, the positive electrode may exhibit a gas generation amount of 15 mL/g or less, specifically, 13 mL/g or less, 10 mL/g or less, or 5 mL/g or less.

As another example, when stored at 60° C. for 4 weeks after activation, the positive electrode may exhibit a gas generation amount of 5 mL/g or less, specifically, 3 mL/g or less, 2 mL/g or less, or 1.8 mL/g or less.

In this case, the positive electrode active material may be a lithium composite transition metal oxide including two or more elements selected from the group consisting of nickel (Ni), cobalt (Co), manganese (Mn), aluminum (Al), zinc (Zn), titanium (Ti), magnesium (Mg), chromium (Cr), and zirconium (Zr). For example, the positive electrode active material may be a layered compound such as a lithium cobalt oxide ($LiCoO_2$), a lithium nickel oxide ($LiNiO_2$), or the like, or a layered compound substituted with one or more transition metals; a lithium manganese oxide represented by the chemical formula $Li_{1+x}Mn_{2-x}O_4$ (where x is 0 to 0.33) such as $LiMnO_3$, $LiMn_2O_3$, $LiMnO_2$, or the like; a lithium copper oxide such as $Li_2CuO_2$ or the like; a vanadium oxide such as $LiV_3O_8$, $Li_3VO_4$, $V_2O_5$, $Cu_2V_2O_7$, or the like; a Ni-site-type lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); a lithium manganese composite oxide represented by $LiNi_xMn_{2-x}O_4$ and having a spinel structure; $LiMn_2O_4$ in which some Li ions in the chemical formula have been substituted with alkaline earth metal ions; a disulfide compound; $Fe_2(MoO_4)_3$; or the like.

In addition, the sacrificial positive electrode material may be prepared by the above-described method according to the present invention, and the electrical conductivity of the sacrificial positive electrode material may be controlled within a specific range using lithium oxide that satisfies a specific average particle size ($D_{50}$) range, and accordingly, a positive electrode including the same may exhibit a substantially smaller amount of gas, particularly, oxygen ($O_2$) gas, generated during activation.

Specifically, the sacrificial positive electrode material may have a powder electrical conductivity of $1\times10^{-4}$ S/cm or more, and specifically the upper limit thereof may be $9\times10^{-3}$ S/cm or less, $8\times10^{-3}$ S/cm or less, $7\times10^{-3}$ S/cm or less, or $6\times10^{-3}$ S/cm or less, and the lower limit thereof may be $5\times10^{-4}$ S/cm or more, $8\times10^{-4}$ S/cm or more, $1\times10^{-3}$ S/cm or more, or $2\times10^{-3}$ S/cm or more. More specifically, the sacrificial positive electrode material may have a powder electrical conductivity of $1\times10^{-3}$ S/cm to $9\times10^{-3}$ S/cm, $2\times10^{-3}$ S/cm to $9\times10^{-3}$ S/cm, $4\times10^{-3}$ S/cm to $8.5\times10^{-3}$ S/cm, $4\times10^{-3}$ S/cm to $6.5\times10^{-3}$ S/cm, or $5\times10^{-3}$ S/cm to $8.2\times10^{-3}$ S/cm.

The sacrificial positive electrode material may be included in an amount of 0.001 to 5.0 parts by weight with respect to 100 parts by weight of the positive electrode active material. More specifically, the sacrificial positive electrode material may be included in an amount of 0.001 to 4.0 parts by weight, 0.001 to 3.0 parts by weight, 0.001 to 2.0 parts by weight, 0.001 to 1.0 parts by weight, 0.01 to 2.0 parts by weight, 0.05 to 2.0 parts by weight, 0.1 to 2.0 parts by weight, or 0.1 to 1.5 parts by weight with respect to 100 parts by weight of the positive electrode active material.

The conductive material may be added in an amount of 1 to 20 parts by weight, specifically, 1 to 10 parts by weight, 1 to 5 parts by weight, 3 to 8 parts by weight, or 2 to 5 parts by weight with respect to 100 parts by weight of the positive electrode active material.

In addition, the conductive material is not particularly limited as long as it does not cause a chemical change in a battery and has conductivity. For example, graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; fluorocarbon; metal powder such as aluminum powder, nickel powder, or the like; a conductive whisker such as zinc oxide, potassium titanate, or the like; a conductive metal oxide such as titanium oxide or the like; or a conductive material such as a polyphenylene derivative or the like, may be used.

The organic binder polymer is a component that aids in the binding of the active material, the conductive material, and the like to one another and to a current collector and may be added in an amount of 1 to 20 parts by weight, specifically, 1 to 10 parts by weight, 1 to 5 parts by weight, 3 to 8 parts by weight, or 2 to 5 parts by weight with respect to 100 parts by weight of the positive electrode active material.

In addition, examples of the organic binder polymer include polyvinylidene fluoride (PVdF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diether polymer (EPDM), a sulfonated EPDM, styrene-butyrene rubber, fluoro-rubber, and various copolymers thereof.

The positive electrode may further include a filler for suppressing the expansion of the positive electrode in addition to the positive electrode active material, the conductive material, and the organic binder polymer, and the filler is not particularly limited as long as it is a fibrous material that does not cause a chemical change in a battery. Specifically, an olefin-based polymer such as polyethylene, polypropylene, or the like, a fibrous material such as glass fiber, carbon fiber, or the like may be used as the filler.

The positive electrode current collector is not particularly limited as long as it does not cause a chemical change in a battery and has high conductivity. For example, stainless steel, aluminum, nickel, titanium, calcined carbon, or the like may be used, and in the case of aluminum or stainless steel, a surface thereof has been treated with carbon, nickel, titanium, silver, or the like. Also, fine irregularities may be formed on the surface of the positive electrode current collector to increase the adhesion of the positive electrode active material, and various forms such as a film, a sheet, a foil, a net, a porous body, a foam, and a nonwoven body are possible. Also, the average thickness of the positive electrode current collector may be appropriately applied in a range of 3 to 500 μm in consideration of the conductivity and total thickness of the positive electrode to be manufactured.

Electrode Assembly

Still another aspect of the present invention provides an electrode assembly including the above-described positive electrode.

The electrode assembly according to the present invention may include the above-described positive electrode, a negative electrode, and a separator interposed between the positive electrode and the negative electrode. In some cases, the separator may be excluded.

In this case, the negative electrode is manufactured by applying a negative electrode active material on a negative electrode current collector, followed by drying and pressing, and as necessary, it may optionally further include a conductive material, an organic binder polymer, a filler, and the like as in the positive electrode.

As the negative electrode active material, materials may be used such as, for example, carbon and graphite materials such as graphite having a completely layered crystal structure such as natural graphite, soft carbon having a low crystallinity layered crystal structure (graphene structure; a structure in which hexagonal honeycomb planes of carbon are arranged in layers), hard carbon in which these structures are mixed with amorphous parts, artificial graphite, expanded graphite, carbon fiber, non-graphitizable carbon, carbon black, carbon nanotubes, fullerenes, activated carbon, and the like; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, Group 2 and Group 3 elements of the periodic table, halogens; $0 < x \le 1$; $1 \le y \le 3$; $1 \le z \le 8$); lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers such as polyacetylene and the like; Li—Co—Ni-based materials; titanium oxide; lithium titanium oxide, and the like may be used.

Materials may be used such as: graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; fluorocarbon; metal powder such as aluminum powder, nickel powder, or the like; a conductive whisker such as zinc oxide, potassium titanate, or the like; a conductive metal oxide such as titanium oxide or the like; or a conductive material such as a polyphenylene derivative or the like.

As one example, as the negative electrode active material, a mixture of a carbon and graphite material (80 to 95 wt %) and $SiO_2$ (5 to 20 wt %) may be used, and the carbon and graphite material may be a mixture of graphite and/or acetylene black and carbon nanotubes in a weight ratio of 1:0.05 to 0.5.

In addition, the negative electrode current collector is not particularly limited as long as it does not cause a chemical change in a battery and has high conductivity. For example, copper, stainless steel, nickel, titanium, calcined carbon, or the like may be used, and copper or stainless steel whose surface has been treated with carbon, nickel, titanium, silver, or the like may also be used. Also, like the positive electrode current collector, the negative electrode current collector may have fine irregularities formed on the surface thereof to increase the adhesion of a negative electrode active material, and various forms such as a film, a sheet, a foil, a net, a porous body, a foam, and a nonwoven body are possible. Also, the average thickness of the negative electrode current collector may be appropriately applied in a range of 3 to 500 μm in consideration of the conductivity and total thickness of a negative electrode to be manufactured.

Furthermore, the separator is interposed between the positive electrode and the negative electrode, and an insulating thin film having high ion permeability and mechanical strength is used. Although the separator is not particularly limited as long as it is commonly used in the art, specifically, a sheet or non-woven fabric made of chemical-resistant and hydrophobic polypropylene, glass fiber, polyethylene, or the like may be used, and in some cases, a composite separator may be used in which a porous polymer substrate such as the sheet or non-woven fabric is coated with inorganic particles/organic particles by an organic binder polymer. When a solid electrolyte such as a polymer or the like is used as an electrolyte, the solid electrolyte may serve as the separator. Also, the separator may have an average pore diameter of 0.01 to 10 μm and an average thickness of 5 to 300 μm.

Meanwhile, the electrode assembly may be accommodated in a cylindrical battery, a prismatic battery, or a pouch-type battery while being wound in the form of a jelly roll or accommodated in a folding or stack-folding type in a pouch-type battery.

As one example, the electrode assembly may be accommodated in a cylindrical battery or a pouch-type battery while being wound in the form of a jelly roll.

Lithium Secondary Battery

Yet another aspect of the present invention provides a lithium secondary battery including the above-described electrode assembly.

The lithium secondary battery according to the present invention may have a structure in which the electrode assembly is impregnated with a lithium salt-containing liquid electrolyte.

In this case, the lithium salt-containing liquid electrolyte may consist of a liquid electrolyte and a lithium salt. As the liquid electrolyte, a non-aqueous organic solvent, an organic solid electrolyte, an inorganic solid electrolyte, or the like may be used.

As the non-aqueous organic solvent, for example, an aprotic organic solvent such as N-methyl-2-pyrrolidinone, ethylene carbonate, propylene carbonate, butylene carbonate, dimethyl carbonate, diethyl carbonate, γ-butyrolactone, 1,2-dimethoxyethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like may be used.

As the organic solid electrolyte, for example, polyethylene derivatives, polyethylene oxide derivatives, polypropylene oxide derivatives, phosphoric acid ester polymers, poly alginate lysine, polyester sulfide, polyvinyl alcohol, polyvinylidene fluoride, polymers including ionic dissociation groups, or the like may be used.

As the inorganic solid electrolyte, for example, nitrides, halides, or sulfates of Li, such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like, may be used.

The lithium salt is a substance that is readily soluble in a non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, lithium imide, or the like may be used.

In addition, in order to improve charging/discharging characteristics, flame retardancy, and the like, for example, pyridine, triethylphosphite, triethanolamine, cyclic ether, ethylenediamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the liquid electrolyte. In some cases, a halogen-containing solvent such as carbon tetrachloride, ethylene trifluoride, or the like may be further included to impart incombustibility, carbon dioxide gas may be further included to enhance high-temperature storage characteristics, and fluoro-ethylene carbonate (FEC), propene sultone (PRS), or the like may be further included.

Meanwhile, yet another aspect of the present invention provides a battery module including the above-described secondary battery as a unit cell and also provides a battery pack including the battery module.

The battery pack may be used as power sources of medium-to-large-sized devices that require high-temperature stability and high rate characteristics such as long cycle characteristics, and specific examples of the medium-to-large-sized devices include: power tools powered by electric motors; electric vehicles including electric vehicles (EVs), hybrid electric vehicles (HEVs), plug-in hybrid electric vehicles (PHEVs), and the like; electric two-wheeled vehicles including electric bicycles (E-bikes) and electric scooters (E-scooters); electric golf carts; power storage systems; and the like, and more specific examples thereof include HEVs, but the present invention is not limited thereto.

Hereinafter, the present invention will be described in more detail with reference to examples and experimental examples.

However, it should be understood that the following examples and experimental examples are given for the purpose of illustration only and are not intended to limit the scope of the present invention.

Examples 1 to 5 and Comparative Examples 1 and 2. Preparation of Sacrificial Positive Electrode Material Lithium oxide ($Li_2O$, unimodal distribution) and cobalt oxide (CoO) were put into a reactor such that a molar ratio thereof was 3.0 to 3.03 and uniformly dry-mixed for about 30 minutes using a mixer. Then, the prepared raw material mixture was input into an electric furnace and fired under an argon gas (Ar) atmosphere at about 700° C. for 10 hours to obtain lithium cobalt oxide ($Li_6CoO_4$). In this case, the average particle size ($D_{50}$) and minimum particle size ($D_{min}$) of lithium oxide ($Li_2O$) and the partial pressure of oxygen gas ($O_2$) contained in argon gas during the calcinating are as shown in the following Table 1.

TABLE 1

| | Particle size of lithium oxide [μm] | | $O_2$ partial |
|---|---|---|---|
| | $D_{50}$ | $D_{min}$ | pressure [%] |
| Example 1 | 17.5 ± 0.5 | 2.75 ± 0.01 | 0.01~0.08 |
| Example 2 | 28.1 ± 0.5 | 5.01 ± 0.05 | 0.01~0.08 |
| Example 3 | 49.5 ± 0.5 | 20.4 ± 0.5 | 0.01~0.08 |
| Example 4 | 28.1 ± 0.5 | 5.01 ± 0.05 | 0 |
| Example 5 | 28.1 ± 0.5 | 5.01 ± 0.05 | 1.01~1.5 |
| Comparative Example 1 | 5.0 ± 0.1 | 0.8 ± 0.05 | 0.01~0.08 |
| Comparative Example 2 | 70.0 ± 0.5 | 31.2 ± 0.5 | 0.01~0.08 |

Experimental Example 1

In order to evaluate the electrical conductivity of the sacrificial positive electrode material prepared according to the present invention, the electrical conductivities of the sacrificial positive electrode materials prepared in Examples 1 to 3 and Comparative Examples 1 and 2 were measured. In this case, the measurement was conducted by measuring the volume of each sacrificial positive electrode material and the sheet resistance according to a pressure change by a four-point probe method using a powder resistivity tester and calculating powder electrical conductivity using the measured volume and input mass, and results thereof are shown in the following Table 2.

TABLE 2

| | Examples | | | Comparative Examples | |
|---|---|---|---|---|---|
| Units: S/cm | 1 | 2 | 3 | 1 | 2 |
| Electrical conductivity | $8.02 \times 10^{-3}$ | $6.42 \times 10^{-3}$ | $5.31 \times 10^{-3}$ | $7.84 \times 10^{-5}$ | $4.32 \times 10^{-5}$ |

As shown in Table 2, it can be seen that the sacrificial positive electrode materials prepared in Examples 1 to 3 exhibit electrical conductivities of $1\times10^{-3}$ S/cm to $8.5\times10^{-3}$ S/cm and thus satisfy the powder electrical conductivity according to the present invention.

Experimental Example 2

In order to evaluate the performance of the sacrificial positive electrode materials prepared according to the present invention, experiments were conducted as follows.

A) Measurement of Gas Emission Amount

An N-methylpyrrolidone solvent was input into a homo mixer, and each sacrificial positive electrode material prepared in Examples 1 to 5 and Comparative Examples 1 and 2, an acetylene black conductive material, a modified silanol binder, and a dispersant were input in a weight ratio of 95:3:1.7:0.3 and then mixed at 3,000 rpm for 60 minutes to prepare a pre-dispersion.

The prepared pre-dispersion was mixed with a positive electrode active material ($LiNi_{0.6}Co_{0.2}Mn_{0.2}O_2$) so that the content of the sacrificial positive electrode material was 2 parts by weight with respect to 100 parts by weight of the positive electrode active material, and a positive electrode active material mixed in an N-methylpyrrolidone solvent, a PVdF binder, and a carbon black conductive material were put into a homo mixer at a weight ratio of 96:1:3, and then dispersed at 3,000 rpm for 80 minutes to prepare a slurry for a positive electrode. The prepared slurry was applied on one surface of an aluminum current collector, dried at 100° C., and then rolled to manufacture a positive electrode.

A 2032-type cell was fabricated using the positive electrode and a lithium metal counter electrode. A separator (thickness: about 16 μm) made of a porous polyethylene (PE) film was interposed between the positive electrode and the lithium metal counter electrode, and a liquid electrolyte was injected to fabricate a half-cell-type cell.

In this case, as the liquid electrolyte, a solution obtained by mixing ethylene carbonate (EC): ethyl methyl carbonate (EMC) (volume ratio=3:7), lithium hexafluorophosphate ($LiPF_6$, 0.7 M), lithium bis(fluorosulfonyl)imide (LiFSI, 0.5 M), lithium tetrafluoroborate ($LiBF_4$, 0.2 wt %), vinyl carbonate (VC, 2 wt %), 1,3-propanesultone (PS, 0.5 wt %), and ethylene sulfate (Esa, 1 wt %) was used.

The fabricated cell was charged/discharged once under the condition of 4.5 C/0.3 C to carry out formation. And then the fabricated cell was analyzed the amount of gas generated respectively (1) during each charge and discharge which were repeatedly performed 50 times at 45° C. under 0.3C/0.3C condition and (2) during storage at 60° C. for 4 weeks. Results thereof are shown in the following Table 3 and FIGS. 1 and 2.

TABLE 3

| | Examples | | | | | Comparative Examples | |
|---|---|---|---|---|---|---|---|
| Units: mL/g | 1 | 2 | 3 | 4 | 5 | 1 | 2 |
| Gas generation amount during initial charging and discharging (formation) | 111 | 99.89 | 75.5 | 111.5 | 120.4 | 101.7 | 114.5 |

As shown in Table 3 and FIGS. 1 and 2, the sacrificial positive electrode materials prepared according to the present invention exhibited a reduced gas generation amount during the charging/discharging process. This tendency can be confirmed as the average particle size ($D_{50}$) of the lithium precursor, that is, lithium oxide ($Li_2O$), used in the preparation of the sacrificial positive electrode material was appropriately sized, and oxygen gas ($O_2$) in the inert gas used in calcinating was used at a sufficiently lower partial pressure.

B) Evaluation of Initial Charging and Discharging

A half-cell type cell was fabricated in the same manner as in the measurement of a gas emission amount, except that a solution obtained by mixing EMC:dimethyl carbonate (DMC):diethyl carbonate (DEC) (volume ratio=1:2:1), lithium hexafluorophosphate ($LiPF_6$, 1.0 M), and VC (2 wt %) was used as a liquid electrolyte.

The fabricated cell was charged and discharged (formation) to measure initial charge capacity. In this case, the charging and discharging (formation) were performed at 25° C. under 70 mAh/3 mAh conditions, and results thereof are shown in the following Table 4 and FIG. 3.

TABLE 4

| | Average particle size ($D_{50}$) of $Li_2O$ [μm] | $O_2$ partial pressure [%] | Initial charge capacity [mAh] |
|---|---|---|---|
| Example 1 | 17.5 ± 0.5 | 0.01~0.08 | 817 |
| Example 2 | 28.1 ± 0.5 | 0.01~0.08 | 764.7 |
| Example 3 | 49.5 ± 0.5 | 0.01~0.08 | 654.8 |
| Example 4 | 28.1 ± 0.5 | 0 | 643.9 |
| Example 5 | 28.1 ± 0.5 | 1.01~1.5 | 682 |
| Comparative Example 1 | 5.0 ± 0.1 | 0.01~0.08 | 520.2 |
| Comparative Example 2 | 70.0 ± 0.5 | 0.01~0.08 | 594.1 |

As shown in Table 4 and FIG. 3, it can be seen that the sacrificial positive electrode materials prepared according to the present invention were effective in enhancing battery performance.

Specifically, the batteries including the sacrificial positive electrode materials of Examples 1 to 5 exhibited a tendency in which initial charge capacity was higher as the average particle size ($D_{50}$) of a lithium precursor, that is, lithium oxide ($Li_2O$), decreased. This means that as lithium oxide ($Li_2O$) has a smaller average particle size ($D_{50}$), charge capacity is enhanced, but an amount of gas generated during charging/discharging and/or storage after activation is increased.

From these results, it can be seen that, by adjusting the electrical conductivity of the sacrificial positive electrode material within a specific range using a lithium precursor that satisfies a specific size in preparation, the sacrificial positive electrode material prepared according to the present invention is effective in enhancing batter performance and can reduce the generation of gas, particularly, oxygen ($O_2$) gas, in an electrode assembly during charging and discharging of a battery, and thus the stability and lifespan of a battery including the same are effectively improved.

While the present invention has been described above with reference to the exemplary embodiments, it can be understood by those skilled in the art that various modifications and alterations may be made without departing from the spirit and technical scope of the present invention described in the appended claims.

Therefore, the technical scope of the present invention should be defined by the appended claims and not limited by the detailed description of the specification.

The invention claimed is:

1. A method of preparing a sacrificial positive electrode material, comprising:

calcinating a raw material mixture of lithium oxide ($Li_2O$) and cobalt oxide (CoO) to prepare a lithium cobalt metal oxide represented by the following Chemical Formula 1, wherein the lithium oxide ($Li_2O$) has an average particle size ($D_{50}$) of 50 μm or less, wherein the lithium oxide ($Li_2O$) has a unimodal particle size distribution, wherein 80 to 90% of all particles are in a particle size range of 10 μm to 45 μm, and 65 to 75% of all particles are in a particle size range of 15 μm to 35 μm, and the sacrificial positive electrode material has an electrical conductivity of $1\times10^{-4}$ S/cm or more:

[Chemical Formula 1]

$$Li_xCo_{(1-y)}M_yO_{4-z}A_z$$

wherein,

M is at least one selected from the group consisting of Ti, Al, Zn, Zr, Mn, and Ni, A is an oxygen-substituted halogen, and x, y, and z satisfy $5 \le x \le 7$, $0 \le y \le 0.4$, and $0 \le z \le 0.001$.

2. The method of claim 1, wherein the electrical conductivity ranges from $1\times10^{-3}$ S/cm to $9\times10^{-3}$ S/cm.

3. The method of claim 1, wherein the calcinating is performed at 500 to 800° C.

4. The method of claim 1, wherein the raw material mixture of lithium oxide ($Li_2O$) and cobalt oxide (CoO) is obtained by mixing lithium oxide ($Li_2O$) and cobalt oxide (CoO) at a molar ratio of 2 to 4:1.

5. The method of claim 1, wherein the lithium oxide ($Li_2O$) has an average particle size ($D_{50}$) of 15 μm to 35 μm.

6. The method of claim 1, wherein the lithium oxide ($Li_2O$) has a minimum particle size ($D_{min}$) of 2 μm or more.

7. The method of claim 1, wherein the sacrificial positive electrode material satisfies the following Equation 1:

$$V_{gas} = -1.07 \times D_{Li2O} + A \quad \text{[Equation 1]}$$

wherein, $V_{gas}$ represents an amount (units: mL/g) of gas generated in an electrode assembly comprising the sacrificial positive electrode material, $D_{Li2O}$ represents an average particle size ($D_{50}$, units: μm) of lithium oxide ($Li_2O$), and A is a constant and satisfies $128 \le A \le 132$.

* * * * *